(12) United States Patent
Mittelstaedt et al.

(10) Patent No.: US 8,126,977 B2
(45) Date of Patent: Feb. 28, 2012

(54) METHOD AND SYSTEM FOR SENDING BULK ELECTRONIC MESSAGES

(75) Inventors: Jason Mittelstaedt, Gallatin Gateway, MT (US); Erich Hannan, Bozeman, MT (US)

(73) Assignee: RightNow Technologies, Inc., Bozeman, MT (US)

( * ) Notice: Subject to any disclaimer, the term of this patent is extended or adjusted under 35 U.S.C. 154(b) by 0 days.

(21) Appl. No.: 12/535,105

(22) Filed: Aug. 4, 2009

(65) Prior Publication Data

US 2010/0042694 A1 Feb. 18, 2010

Related U.S. Application Data

(63) Continuation of application No. 10/748,009, filed on Dec. 30, 2003, now Pat. No. 7,574,478.

(51) Int. Cl.
*G06F 13/00* (2006.01)

(52) U.S. Cl. ................ 709/206; 709/205; 709/224

(58) Field of Classification Search .......... 709/204, 709/206, 223, 224, 205
See application file for complete search history.

(56) References Cited

U.S. PATENT DOCUMENTS

| | | |
|---|---|---|
| 6,112,049 A | 8/2000 | Sonnenfeld |
| 6,978,248 B1 | 12/2005 | Walker et al. |
| 7,156,290 B2 | 1/2007 | Stemmle et al. |
| 7,370,285 B1 * | 5/2008 | Nickerson et al. ............ 715/808 |
| 7,574,478 B2 | 8/2009 | Mittelstaedt et al. |
| 2002/0169835 A1 | 11/2002 | Paul, Jr. et al. |
| 2004/0153360 A1 | 8/2004 | Schumann |

* cited by examiner

*Primary Examiner* — Viet Vu
(74) *Attorney, Agent, or Firm* — Husch Blackwell LLP

(57) ABSTRACT

A method and system for sending massive e-mail messages that include test messages sent to selected small portions of the global targeted audience. A message containing the text or content part of the message can be stored and retrieved for inclusion in each test message so that the content does not need to be repeatedly retyped. The audience members are selected randomly for each test so that the tests provide statistically valid results. The test results are conveniently grouped for ease of evaluation of the test feedback.

10 Claims, 8 Drawing Sheets

NEW BUTTON

1. ADD A ROW TO THE FORMATS IFRAME
2. SET DEFAULT VALUES AS FOLLOWS:

| FIELD | VALUE |
|---|---|
| NAME | MESSAGE CELL #N |
| STATUS | DRAFT |
| MESSAGE TYPE | RANDOM SAMPLE (QUANTITY RADIO SELECTED) |
| MAILBOX | DEFAULT MARKETING MAILBOX |

- ALL OTHER VALUES ARE BLANK OR UNSET

COPY BUTTON

1. COPY THE CURRENTLY HIGHLIGHTED ROW.
2. CREATE A NEW ROW IN THE FORMATS IFRAME AND HIGHLIGHT IT.
3. LOAD THE DATA FOR THE NEWLY CREATED COPY INTO THE BOTTOM EDIT AREA.
4. PER FIELD HANDLING IS AS FOLLOWS:
   - COPY THE FOLLOWING AS-IS: DOCUMENT, PROOF LIST, SUBJECT, MAILBOX, FROM NAME, FROM ADDRESS, REPLY NAME, REPLY ADDRESS
   - NAME - PREPEND "COPY - " TO THE CURRENT NAME
   - STATUS - SET TO 'DRAFT'
   - MESSAGE TYPE - ALWAYS CLEAR OUT THE VALUE AND SELECT THE 'QUANTITY' RADIO BUTTON
   - SEND DATE/TIME - UNSET (NO VALUE)
   - SEND PROOF ON UPDATE CHECKBOX - UNSELECTED
   - CREATED BY AND UPDATED BY - ACCOUNT ID OF THE CURRENTLY LOGGED IN STAFF PERSON

FIG. 4.

DELETE BUTTON

1. ALERT A CONFIRMATION MESSAGE
   - IF THE MESSAGE CELL WAS LOADED FROM THE DATABASE, THEN ALERT "ARE YOU SURE YOU WANT TO DELETE? TO CANCEL THIS OPERATION YOU MUST ABANDON ALL CURRENT EDITS"
   - IF THE MESSAGE CELL WAS CREATED DURING THE CURRENT EDIT SESSION, THE ALERT "ARE YOU SURE YOU WANT TO DELETE: THIS OPERATION CAN NOT BE UNDONE."
2. CLEAR ALL DATA FROM THE BOTTOM EDIT AREA
3. DELETE THE CURRENTLY SELECTED ROW FROM THE IFRAME
4. DO NOT SELECT ANOTHER ROW IN THE FORMATS IFRAME AND DISABLE THE BOTTOM EDIT AREA.

FIG. 5

MESSAGE CELL EDITING

1. IF THE USER HIGHLIGHTS A MESSAGE CELL WHERE THE STATUS IS 'COMPLETE' OR 'CLOSED' THEN DISABLE THE MESSAGE CELL FORM BEING EDITED. THE USER WILL STILL NEED THE ABILITY TO VIEW THE MESSAGE CELL IN A READ-ONLY MODE.
2. THE USER CANNOT DELETE A MESSAGE CELL IF THE NUM_SENT IS GREATER THAN 0.
3. THE FIRST TIME A MESSAGE CELL IS LOADED IN A MAILING EDIT SESSION, THE 'SEND PROOF ON UPDATE' CHECKBOX SHOULD BE UNSELECTED. SUBSEQUENT LOADS DURING THE SAME EDIT SESSION SHOULD MAINTAIN THE STATE OF THE CHECKBOX (STAY CHECKED IF THE USER CHECKS IT).

FIG. 6

MESSAGE CELL CREATE/UPDATE VALIDATION

1. REQUIRED FIELDS THAT SHOULD CAUSE AN ALERT AND DELAY THE UPDATE OF THE MESSAGE CELL:
   - NAME
   - STATUS - INHERENTLY REQUIRED SINCE THE SELECT BOX WON'T CONTAIN A --  OPTION. NO CHECKING CODE REQUIRED.
   - MESSAGE TYPE - THE USER MUST EITHER
     CHECK THE 'FINAL' CHECKBOX, OR
     SELECT 'QUANTITY' OR 'PERCENT' AND ENTER AN INTEGER VALUE IN THE INPUT BOX
   - SEND DATE/TIME
   - DOCUMENT
   - SUBJECT
   - MAILBOX

2. THERE CAN BE ONE MESSAGE CELL MARKED AS 'FINAL' FOR GIVEN MAILING. ONCE ANY MESSAGE CELL IS MARKED AS FINAL, WE WILL DISABLE THE 'FINAL' CHECKBOX FOR ALL OTHER MESSAGE CELLS.

3. THE USER CANNOT MARK A MESSAGE CELL AS 'FINAL' UNLESS ALL OF THE OTHER MESSAGE CELLS HAVE A STATUS OF 'COMPLETE' OR 'CLOSED'. THIS MEANS THAT YOU CAN'T CREATE A TEST CELL AND A FINAL CELL IN THE SAME EDIT SESSION.

4. IF A 'FINAL' CELL EXISTS, THEN NO OTHER CELLS CAN BE CREATED AND BOTH THE 'NEW' AND 'COPY' BUTTONS WILL BE DISABLED.
   - CAVEAT: A 'FINAL' CELL CAN STILL BE DELETED AS LONG AS THE NUM_SENT VALUE IS 0. SO, WHEN A 'FINAL' CELL GETS DELETED USING THE 'DELETE' BUTTON, THE 'NEW' AND 'COPY' BUTTONS ON THE DELIVERY TAB SHOULD BECOME ENABLED.

5. IF THERE ARE MULTIPLE MESSAGE CELLS THAT HAVE A MESSAGE TYPE OF 'PERCENT' THEN THE TOTAL OF THOSE PERCENTAGES CANNOT EXCEED 100.

METHOD AND SYSTEM FOR SENDING BULK ELECTRONIC MESSAGES

CROSS-REFERENCE TO RELATED APPLICATIONS

This application is a continuation of and claims priority to U.S. application Ser. No. 10/748,009 now U.S. Pat. No. 7,574,478, filed Dec. 30, 2003, which document is hereby incorporated by reference herein to the extent permitted by law.

STATEMENT REGARDING FEDERALLY SPONSORED RESEARCH OR DEVELOPMENT

Not applicable.

TECHNICAL FIELD

This invention relates generally to electronic messaging and more particularly to a method and system for facilitating the creation and transmission of electronic mail messages sent in bulk to a targeted audience.

BACKGROUND OF THE INVENTION

Marketing companies and others make widespread use of the internet to reach potential customers with electronic messages that are often sent in massive quantities to a targeted audience. One practice that has been used to make an email campaign more effective is to first send test messages to a small portion of the targeted audience, with each test message varied in some respect from the other test messages. By obtaining feedback as to which test messages are opened or answered most frequently, or by obtaining other types of feedback as to the effectiveness of the test messages, the final message can be composed using the test message feedback. The final message is then sent to the great bulk of the targeted audience and incorporates features likely to maximize its effectiveness.

Variables such as the time sent, the phrasing of the subject line, the identity of the address to which the message is sent, the address to which a reply can be sent, and the message content can be different in each group of test messages. For example, if it is determined from the test messages that transmission at noon on a Sunday achieves the best acceptance rate, the final bulk message can be sent to the vast majority of the audience members at noon on a Sunday so that the mail campaign effectiveness is maximized. Similarly, it may be determined through the test messages that messages sent from an entity having a familiar or catchy name are more likely to be opened and/or answered. The final message can make use of the test feedback and make use of the familiar or catchy name in the final message to enhance the chance for a successful result. Likewise, the subject line can be tested using different phrases to test for the most effective way to phrase the subject of the message. Variations in the content of the message can be tested in a similar fashion. All of this test feedback can be used to optimize the desired outcome of the email communication, whether the goal is maximized views, clicks, downloads, forwards, leads, sales, etc.

Although this type of testing program for marketing campaigns has been used for a number of years, the test programs have not been fraught with difficulty. Typically, the content of the message must be retyped for each different test message, even though it may be the same text as for other test messages which may differ only in time, address sent from, subject line phrasing or another variable. This can occupy considerable time on the part of the person setting up and sending the test messages, particularly if the text of the message is lengthy or otherwise requires substantial time to prepare. Thus prior testing programs and the associated difficulties have discouraged extensive use of test cells.

Evaluating the feedback from the test messages has also created difficulty and can require substantial time that detracts from the efficiency of the overall email campaign. It is necessary for the audience members who receive the test messages to be selected randomly in order for the tests to be valid statistically. Past practices have not always assured a statistically valid sample.

SUMMARY OF THE INVENTION

The present invention is directed to a method and system which facilitates and expedites email campaigns that involve the transmission and evaluation of test messages.

It is an important object of the invention to provide a method and system in which the content portion of an email message is stored and used in different test messages without the need to recreate or retype the message content for each different test message. This feature of the invention saves significant time and effort on the part of those conducting the email campaign and thus increases its efficiency and decreases its cost.

Another object of the invention is to provide a method and system in which the results of the test mailings and the final mailing are conveniently grouped so that they can be quickly and easily evaluated in an accurate manner. Again, efficiency and accuracy are enhanced and cost savings are achieved.

An additional object of the invention is to provide a method and system in which the members of each part of the overall audience that are selected to receive test messages are chosen randomly so that statistically valid results are achieved from the test messages while ensuring that the contacts included in the tests (one or many) are mutually exclusive to prevent duplicate communication to an individual.

Other and further objects of the invention, together with the features of novelty appurtenant thereto, will appear in the course of the following description.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIGS. 3-7 are specifications for the components of a user interface console that may be incorporated in a system and method for sending email messages in accordance with a preferred embodiment of the invention; and FIGS. 8 and 9 are screens showing a mailing console showing audience definition and indicating the performance of the test cells.

DESCRIPTION OF THE PREFERRED EMBODIMENT

Figure 1:
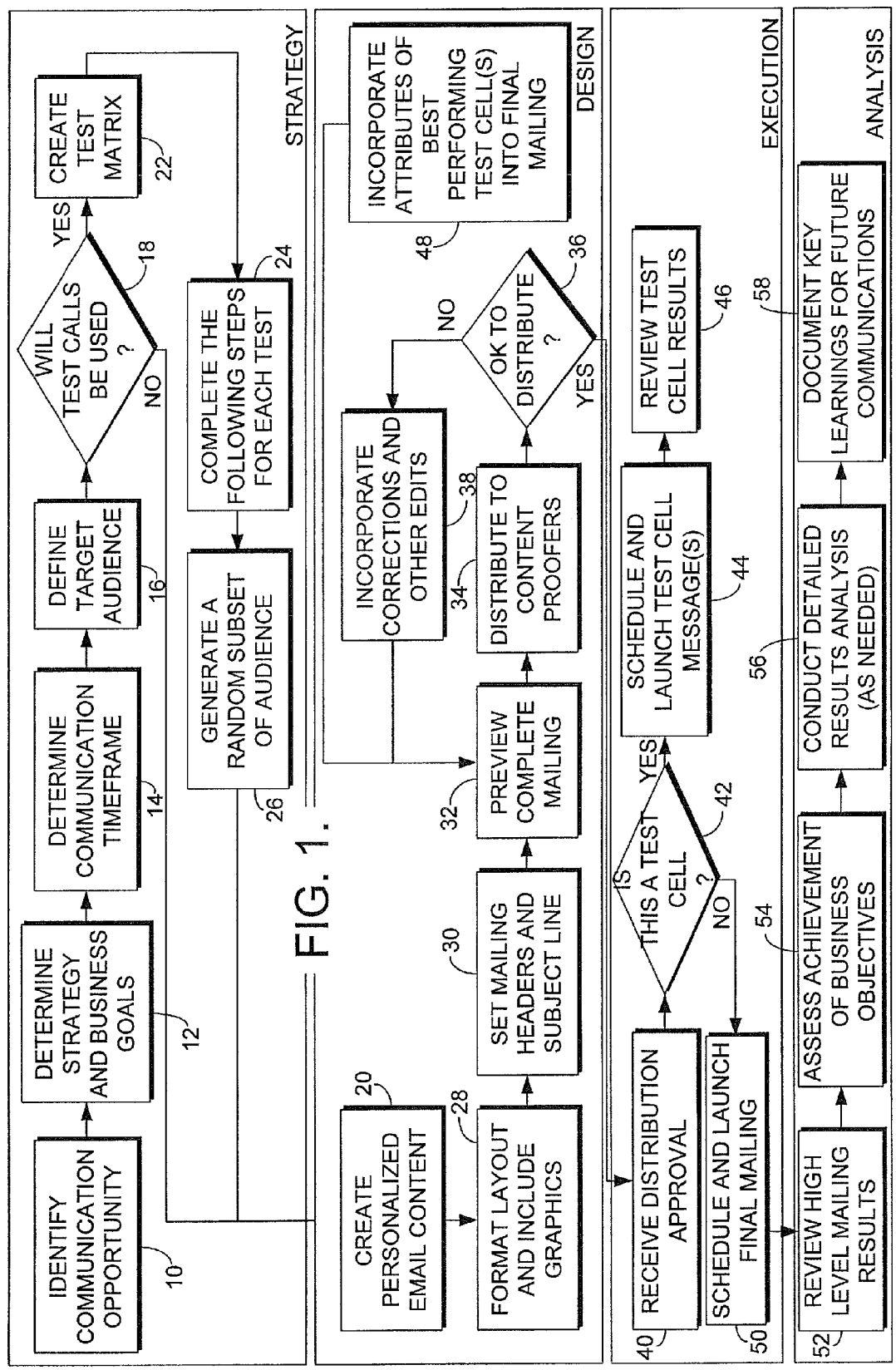
FIG. 1 is a flow chart of the communication process flow for a method and system for sending email messages according to a preferred embodiment of the present invention.

Referring now to the drawings in more detail, FIG. 1 depicts the process flow for an e-mail communication system and method carried out in accordance with a preferred embodiment of the preferred invention. The system includes a strategy section in which the communication opportunity may be identified in block 10. The strategy and business goals are determined in block 12. Block 14 represents a determination of the communication timeframe. The target audience containing members to whom an e-mail message is to be sent are defined in block 16. For example, the target audience may be potential customers of a new product or service that is being promoted by the email campaign. In block 18, a determination is made as to whether test cells will be used. If no test cells are to be used, 20 is entered in the design portion of the system, and the personalized e-mail content is created in block 20. If test cells are to be used, as determined in block 18, a test matrix is created in block 22. The various steps that are to be followed for each test are completed in block 24. In block 26, a random subset of the audience that is to receive one of the tests is generated. block 20 is then entered from block 26.

The design portion of the system includes block 28 where the content is created, layout is determined and the desired graphics are included. The mailing headers and the subject line may be set in block 30. A preview of the complete mailing may then be made in block 32. In block 34, the content of the e-mail message is distributed to proofers. A determination is then made in block 36 as to whether the e-mail is in condition to be distributed. If it is not, corrections and other edits are made in block 38 and the system repeats the operations in blocks 32, 34 and 36.

If it is determined in block 36 that the e-mail message is in condition to be distributed, the execution section of the system is carried out beginning in block 40 where distribution approval is received. A determination is made in block 42 as to whether the e-mail message is a test cell message. If it is a test cell, the test cell message is scheduled and launched in block 44. The test cell results are evaluated and reviewed in block 46. Then, the attributes of the best performing test cell, as determined by the feedback and evaluation of the test cell results, are incorporated into the final mailing in block 48 which is part of the design portion of the system. Then, the mailing is previewed in block 32 and the system proceeds from there in the manner previously described.

If a determination is made in block 42 that a test cell is not involved, the final mailing is scheduled and launched in block 50 in the execution section of the system. An analysis section of the system includes block 52 in which the results of the mailing are reviewed. In block 54, an assessment is made of the achievement of the e-mail with respect to the intended business objectives. The detailed results of the mailing may be analyzed as needed in block 56, and reports can be made. In block 58, any key points learned from the feedback and analysis of the e-mail campaign are documented for use in future communications.

Figure 2:
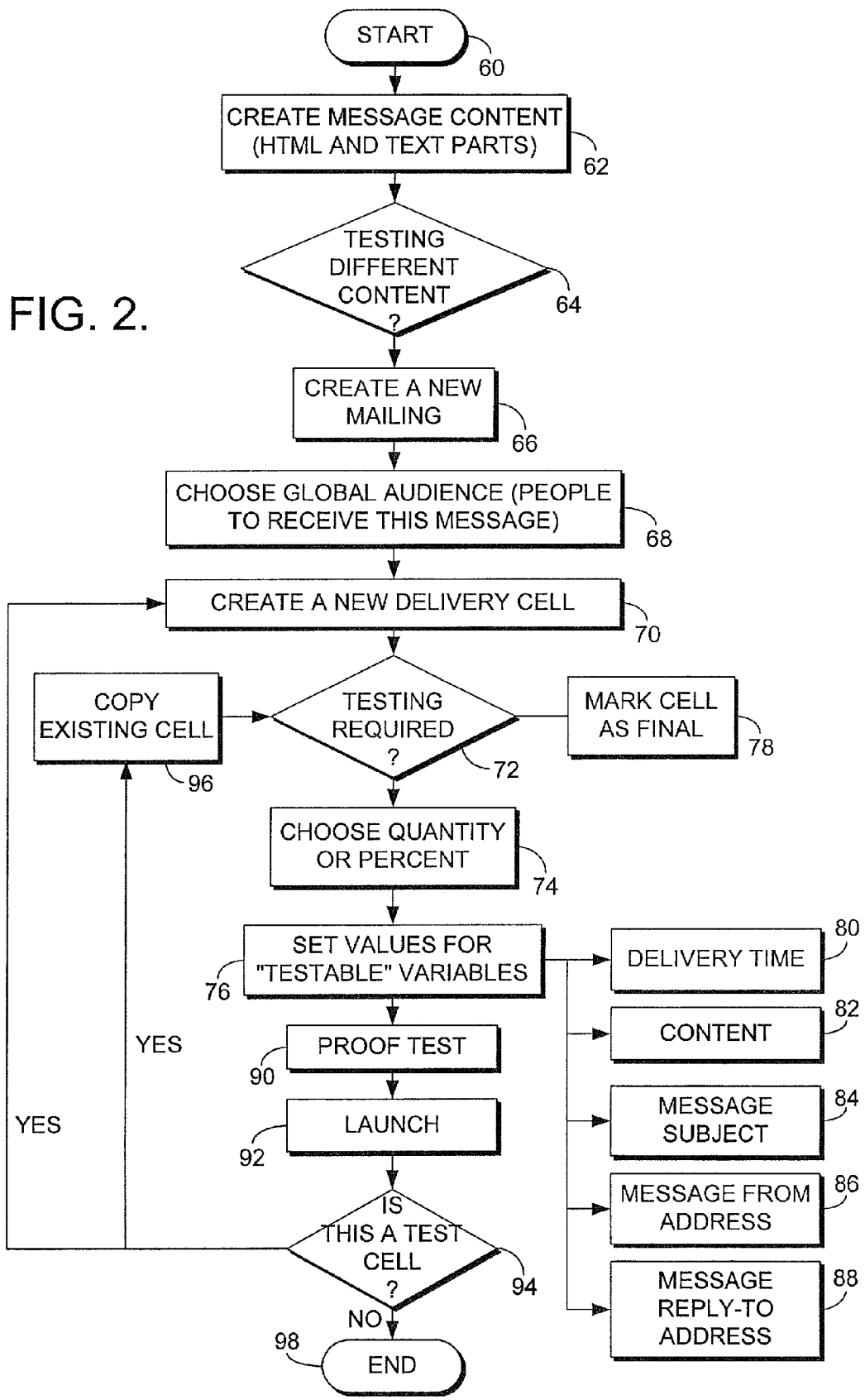
FIG. 2 is a flow chart for the user interface mailing console that may be incorporated in a method and system for sending email messages according to a preferred embodiment of the invention.

FIG. 2 depicts in the form of a functional flow chart a mailing console user interface arranged according to a preferred embodiment of the present invention. After a start operation in block 60, the message content (HTML and the text part) are created in block 62. In block 64, a determination is made as to whether the content of an e-mail message that is to be tested differs from the previous message. If it does, block 62 is entered and the message content is created. If the content is not different, block 66 is entered and a new mailing is created. In block 68, the global audience that includes all of the members to whom the e-mail message is to be sent are chosen. In block 70, a new delivery cell is created.

A determination is made block 72 as to whether testing is required. If testing is required, the quantity or percent of the global audience is selected in block 74. By way of example, a test cell may select a relatively small percentage (such as one or two percent) of the global audience to receive a test message. The members included in the percentage are selected randomly so that statistically valid results are obtained from the test. In block 76, the values for "testable" variables are set. If a determination is made in block 72 that testing is not required, the cell is marked as a final cell in block 78, and block 74 is bypassed.

Examples of variables that are "testable" include the delivery time of the message as indicated block 80, the content of the message as indicated in block 82, the phrasing of the subject of the message as indicated in block 84, the address from which the message is sent as indicated block 86, and the address to which a reply to the message can be sent as indicated in block 88. Any or all of these variables can be changed from one test message to the next. In order to test each variable, it is contemplated that each test message will vary from another test message only in one of the variables indicated in the blocks 80-88.

It is also contemplated in accordance with the present invention that the message content indicated in block 82 may be created and stored in a file and retrieved from the file for inclusion in each different test message. In this fashion, one of the other variables (blocks 80, 84, 86 or 88) can be changed from one message to the next while maintaining a consistent content. This technique has the advantage of eliminating the need for the person setting up the test to retype the message content each time a new test cell is to be created. If the message content is lengthy or otherwise requires a substantial amount of time to set up, eliminating the need to repeat typing of the message each time a different test cell is created is a significant advantage.

After the values for the test variables have been set for each test cell in block 76, the message is proofed in block 90 and then launched in block 92. A determination is made in block 94 as to whether the message is part of a test cell. If it is a test cell, the existing cell is copied in block 96 and a new delivery cell is created in block 70 before a determination is again made in block 72 as to whether additional testing is required. If a determination is made in block 94 that the cell is not a test cell, the routine is ended as indicated in block 96.

In this manner, successive test cells can be created and sent to selected percentages of the overall audience, with each percentage having members that are randomly selected so that the tests are statistically valid. By storing the content portion of the message in a file and retrieving it each time a new message is to be sent with a different variable changed (such as the time or day of delivery, the phrasing of the subject line of the message, the address listed in the "message from" part of the e-mail message or the phrasing of the "reply to" section of the message), the person setting up the test is relieved of the need to retype or otherwise reenter the content portion of the message for each different test. This facilitates the testing process and reduces the time and cost involved in the overall e-mail campaign. At the same time, assurance is made that the tests are valid and that the results that they provide are reliable so that the final e-mail message can incorporate the best combination of attributes that are determined by evaluating the feedback from the test messages. The final message is thus most likely to be effective in reaching the target audience and achieving other desired goals.

Figure 3:
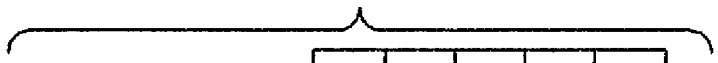

The present invention provides a user interface for the creation and sending of test cells and the final e-mail message. The functional specifications for the components of the user interface are set forth in FIGS. 3-7. FIG. 3 sets forth the functional specifications for a "new button" used to create a new message. Default values of the various aspects of the system are set forth in FIG. 3. FIG. 4 sets forth the functional specifications of a "copy" button which is used for copying of an existing cell.

A delete button is also included with functional specifications indicated in FIG. 5. FIG. 6 sets forth the functional specifications for a message cell editing button of the user interface. FIG. 7 sets forth the functional specifications of a button that is used for message cell creations/updating of the validation of the message. These user interface components provide for simple and quick use of the system by the person creating the test cells and the final e-mail message that is sent to the great bulk of the members of the global audience that is targeted to receive the e-mail message.

Figure 8:
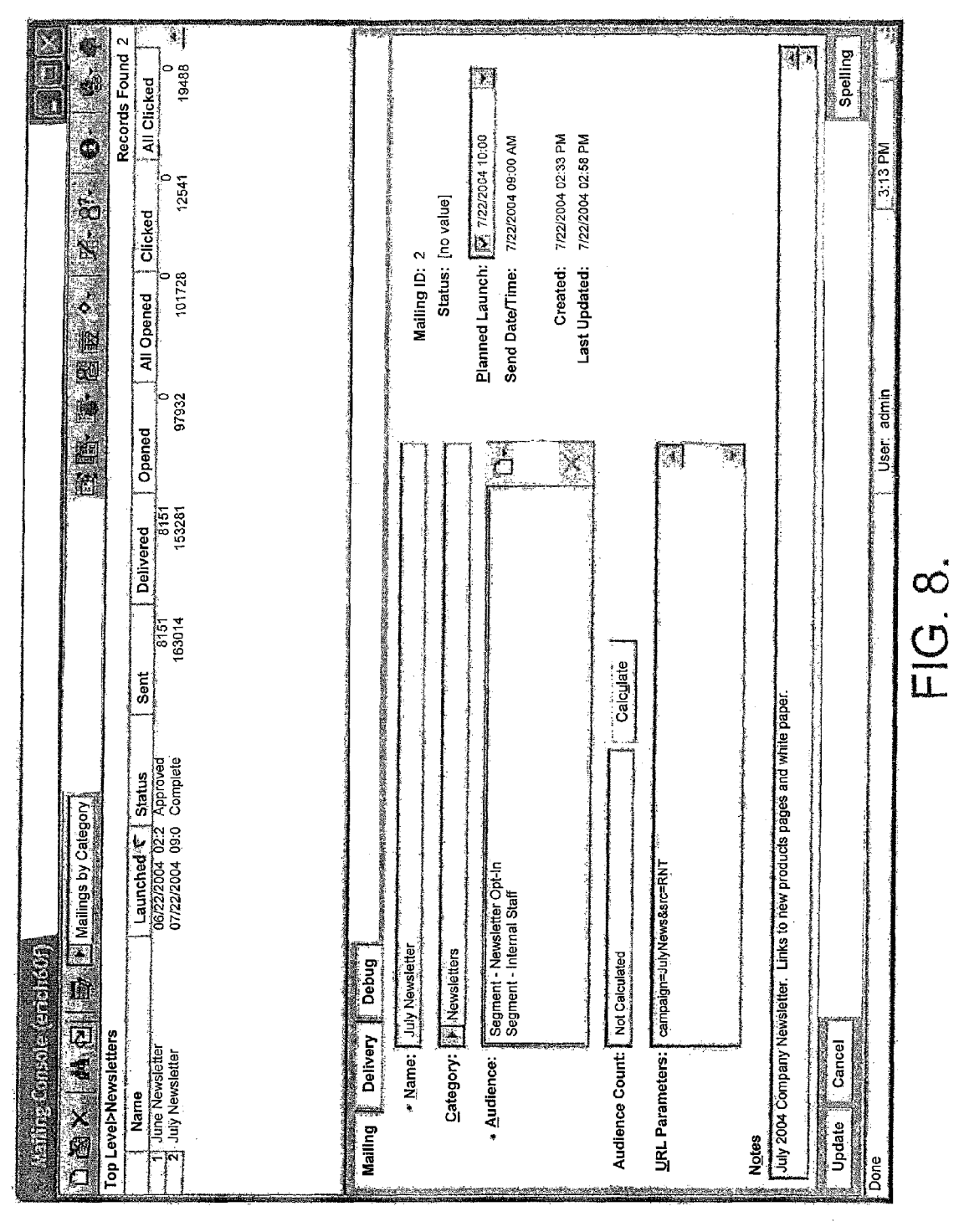

In FIG. 8, the "Mailing" tab has been clicked therefore defining the high level attributes of a mailing and showing an audience definition. In the upper portion of the screen the words "Top Level) Marketing) Monthly Newsletters" appear. From there one may do a categorical scrolldown to a specific newsletter. In the screen (FIG. 8), the "July Newsletter" and an "October Newsletter" are shown indicating that same may be created or edited and the global audience defined for communication purposes. In this instance, 165,000 "July Newsletters" were sent to the "Audience". Further, the "Audience" box shows "Segment-Marketing Opt-In" indicating everyone within the database that has "opted in" for marketing communications.

Figure 9:
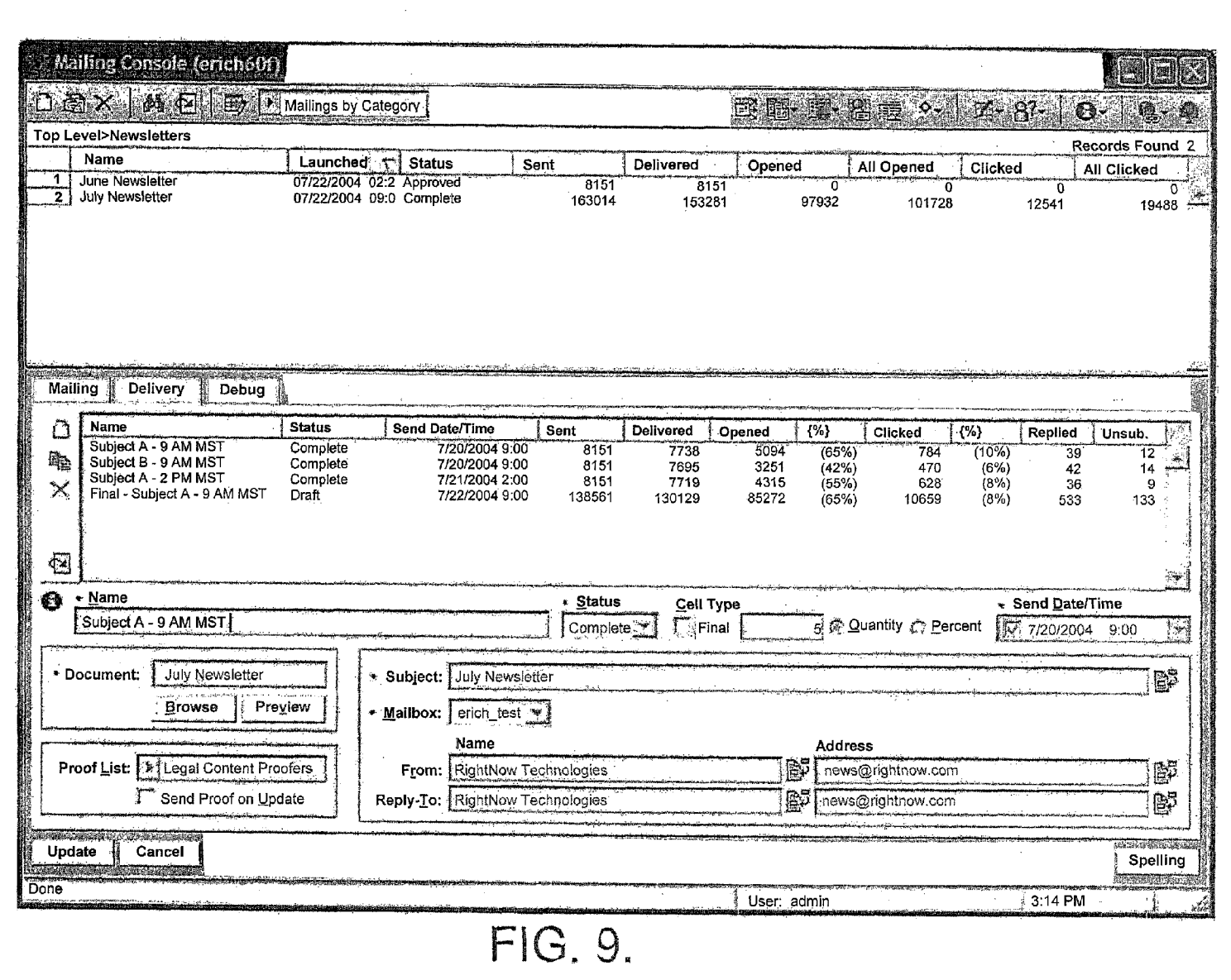

When the "Delivery" tab is selected (see FIG. 9), the actual test cells and final markings are created and launched. Three options (Subject Option A 9:00 a.m., Subject Option B 9:00 a.m., and Subject Option A, 2:00 p.m.) have been depicted therein. This indicates that three test cells were completed and the "Final" communication sent. In the illustrated case, a random percent was taken of the global audience defined in FIG. 8 of the "Marketing Opt-In" audience. As shown, three different "subject" lines were tested at a different time of the day to determine the best performing subject line.

On the right side portion of the "delivery cells" is an inline report. In the illustrated screen, one may observe the first three cells and see that 8,250 were sent of each one. However, the "Opened" rate and the "clicked" rate was higher for the "Subject Option A 9:00 a.m. (64% and 10% respectively) than the others (Subject Option B 9:00 a.m. and Subject Option A 2:00 p.m.). This tells the user that the Subject Option A was more successful and sending at 9:00 a.m. was more successful than sending at 2:00 p.m.

The lower third of the screen (FIG. 9) is populated with the details of "Subject Option A 9:00 a.m." since it was presumed to have been "clicked on". If Subject Option B is clicked, then the lower third of this screen will display that Subject's information thereon.

It should be noted that the cell type, send date and time, the subject line, the document, the from address, the reply to address and possibly other features are all variables that may be tested with the test cells.

It is contemplated that all of the test messages taken together will make up only a small percentage of the global audience that is to receive the e-mail message and certainly a minority of the global audience. Through use of the method and system of the present invention, feedback as to the openings, responses or other measure of effectiveness of the test messages can be used to evaluate which of the variables achieves the best results in statistically valid tests so that the final message can be composed using the combination of variables that is most likely to be effective for the final message that is sent to the majority of the target audience.

When and entire "mailing" has been completed, reports on the critical statistics for each of the delivery cells can be viewed on an inline basis, allowing those evaluating the delivery cells to easily decide which test provides the best results. Additionally, once an e-mail campaign has been completed, the statistics for all of the tests and the much larger final message that is sent can be easily collected into an effective report as to the overall e-mail campaign.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A computer readable storage medium having stored thereon executable program code for sending an electronic mail message to members of a mass audience each connected to a network, where when said program code is executed said program code is operable to perform a method comprising the steps of:

creating a plurality of test messages each having a message content identical in each test message and a plurality of characteristics that vary, each test message varying from all other test messages in at least one of said characteristics, wherein said characteristics include an address from which the message originates and an address to which a reply may be sent, wherein the address from which the message originates and the address to which a reply may be sent are not the same;

storing said message content and retrieving said message content from storage for inclusion in each test message;

sending each test message on said network to different members of said mass audience with all of the test messages together being sent to a minority of the members of said audience;

evaluating feedback as to the effectiveness of each test message;

creating a final message based on the evaluation of the feedback; and sending said final message on the network to all members of said audience that were not sent one of the test messages, wherein said final message is an electronic mail message.

2. A computer readable storage medium as set forth in claim 1, wherein said characteristics include a subject of the message and a time of delivery of the message.

3. A computer readable storage medium as set forth in claim 2, wherein said characteristics include a day of delivery of the message.

4. A system for sending an electronic mail message to members of a mass audience each having a message receiving device connected to a network, said system comprising:

a messaging device on which a plurality of test messages can be composed each having a common content and a plurality of characteristics that are each separate from said content and are varied for each test message to allow each test message to differ from other test messages in one or more of said characteristics, wherein said characteristics include an address from which the message originates and an address to which a reply may be sent, wherein the address from which the message originates and the address to which a reply may be sent are not the same;

a storage file in which said common content can be stored and from which said common content can be retrieved and inserted into each test message; and an electronic mail transmission device for sending each test message on the network to a different group of selected members of the audience and for subsequently sending a final message on the network to all members of the audience not sent one of the test messages, whereby feedback from the test messages can be evaluated as to effectiveness to allow the final message to make use of such feedback for inclusion in the final message of an effective combination of said characteristics, wherein the final message is an electronic mail message.

5. A system as set forth in claim 4, wherein said characteristics include a subject of the message and a time of delivery of the message.

6. A system as set forth in claim 5, wherein said characteristics include a day of the delivery of the message.

7. A system as set forth in claim 4, including means for specifying a selected percentage of the members of said audience to receive each test message.

8. A computing system having computer executable instructions for sending an electronic mail message to members of a mass audience, said system comprising:

a processor for running said system;

a memory for storing said system;

means for creating a plurality of test messages each having a content and a plurality of characteristics that are separate from the content, said test messages each having the same content and varying from one another only in having differences in at least one of said characteristics, wherein said characteristics include an address from which the message originates and an address to which a reply may be sent, wherein the address from which the message originates and the address to which a reply may be sent are not the same;

storing said same content in said memory;

means for retrieving said same content from storage for inclusion in each of said test messages without recreating said same content for each different test message;

means for sending said test messages to selected members of said mass audience with said selected members being randomly determined;

means for obtaining feedback as to the effectiveness of each test message so a final message can be created based on the feedback; and means for sending the final message to all members of the audience that have not been sent one of the test messages, wherein the final message is an electronic mail message.

9. A system as set forth in claim 8, wherein said characteristics include a subject of the message and a time of delivery of the message.

10. A system as set forth in claim 8, including means for specifying a selected percentage of the members of said audience to receive each test message.

* * * * *